(12) United States Patent
Bota et al.

(10) Patent No.: US 9,456,230 B1
(45) Date of Patent: *Sep. 27, 2016

(54) REAL TIME OVERLAYS ON LIVE STREAMS

(71) Applicant: Google Inc., Mounain View, CA (US)

(72) Inventors: Silviu Bota, Horgen (CH); Bianca Milatinovici, Zürich (CH); Christian Ingemar Falk, Zürich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,626

(22) Filed: Jul. 28, 2014

Related U.S. Application Data

(63) Continuation of application No. 13/438,158, filed on Apr. 3, 2012, now Pat. No. 8,832,741.

(51) Int. Cl.
| | |
|---|---|
| H04N 5/445 | (2011.01) |
| H04N 21/235 | (2011.01) |
| H04N 21/84 | (2011.01) |
| H04N 21/6408 | (2011.01) |
| H04N 21/258 | (2011.01) |
| H04N 21/2365 | (2011.01) |
| H04N 21/262 | (2011.01) |

(52) U.S. Cl.
CPC ........ *H04N 21/235* (2013.01); *H04N 21/2365* (2013.01); *H04N 21/25841* (2013.01); *H04N 21/25883* (2013.01); *H04N 21/262* (2013.01); *H04N 21/6408* (2013.01); *H04N 21/84* (2013.01)

(58) Field of Classification Search
CPC ............. H04N 21/235; H04N 21/262; H04N 21/2365

USPC ................................... 725/40, 43, 48, 51, 52
See application file for complete search history.

(56) References Cited

U.S. PATENT DOCUMENTS

| | | | |
|---|---|---|---|
| 7,574,490 B2 | 8/2009 | Smith | |
| 7,937,362 B1 | 5/2011 | Lian et al. | |
| 8,391,774 B2 | 3/2013 | Arseneau et al. | |
| 8,521,141 B2 | 8/2013 | Aguirre et al. | |
| 8,578,432 B2 | 11/2013 | Vasudevan et al. | |
| 2007/0005795 A1 | 1/2007 | Gonzalez | |
| 2008/0313029 A1* | 12/2008 | Evans | G06Q 30/02 705/14.53 |
| 2009/0150943 A1* | 6/2009 | Vasudevan et al. | 725/86 |
| 2010/0257448 A1* | 10/2010 | Squires | 715/717 |
| 2012/0221740 A1 | 8/2012 | Arsenio | |
| 2013/0110921 A1 | 5/2013 | Logan et al. | |

OTHER PUBLICATIONS

Office Action for U.S. Appl. No. 13/438,158, dated Dec. 30, 2013, 19 pages.
Notice of Allowance for U.S. Appl. No. 13/438,158, dated Apr. 23, 2014, 17 pages.

* cited by examiner

*Primary Examiner* — Pankaj Kumar
*Assistant Examiner* — Sahar Baig
(74) *Attorney, Agent, or Firm* — Fenwick & West LLP

(57) ABSTRACT

A system and method for generating and distributing overlay streams in real time over an overlay stream distribution channel that overlays events of a video stream distributed in a separate video channel. Overlay streams are distributed to subscriber recipient components via a unicast channel in order to enhance user viewing. A publisher subscriber component and caching techniques a low latency, high availability unicasting based real time overlay distribution system for a large numbers of concurrent overlay recipients.

17 Claims, 10 Drawing Sheets

REAL TIME OVERLAYS ON LIVE STREAMS

CROSS-REFERENCE TO RELATED APPLICATIONS

This application is a continuation of U.S. patent application Ser. No. 13/438,158, filed Apr. 3, 2012, and entitled, "REAL TIME OVERLAYS ON LIVE STREAMS," the entirety of which is incorporated herein by reference.

TECHNICAL FIELD

This disclosure relates generally to overlaying messages, and in particular to live overlays on live streams of video data.

BACKGROUND

Live streaming current events over the Internet increases demand for a reliable streaming infrastructure. Live streaming feeds are commonly used in such circumstances as major political speeches and events, sporting events, and other cultural happenings. Generally, overlay distribution systems on live video streams are delivered using the same channel as the live video stream (e.g., a same channel). Because the live video stream is broadcasted to all its recipients, in real time, there is typically no problem of latency for corresponding overlays. Overlay distribution systems are broadcast based, and therefore do not suffer from high load problems. Also, if high availability is in demand, redundancy can provide availability independently from number of concurrent overlay recipients. A same source based overlay distribution system however can suffer from increased load as number of concurrent overlay recipients increases, and a same channel framework can be limited from an overlay content perspective.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to overlay streams having overlay messages in response to events of a video stream in accordance with various embodiments disclosed. For example, a system comprises a memory having stored thereon computer executable components and a processor configured to execute computer executable components stored in the memory. The system comprises a set of presentation components that respectively present a live video stream of events occurring in real time via a first channel for user viewing. A set of overlay distribution components publish a set of overlay streams in real time via a second channel respectively. The set of overlay streams include a set of overlay messages that correspond to the events of the live video stream presented in the first channel, in which the set of overlay messages enhance the user viewing of the live video stream of events occurring in real time.

In another embodiment, a system comprises a plurality of overlay distribution components having a processor and a memory. At least one overlay distribution component includes an overlay publisher component that generates an overlay stream having overlay messages that correspond to events of a video stream. A publisher subscriber system component communicatively couples the plurality of overlay distribution systems with one another for distribution of the overlay stream.

In yet another embodiment, a method comprises using a processor to execute computer executable instructions stored in a memory to acts. The acts comprise generating an overlay stream in real time for user viewing, in which the overlay stream includes image data. The acts include presenting the overlay stream, via an overlay channel, that overlays events of a video stream presented via a video channel. The video stream is communicated in real time for the user viewing and the image data of the overlay stream corresponds to the events in real time.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
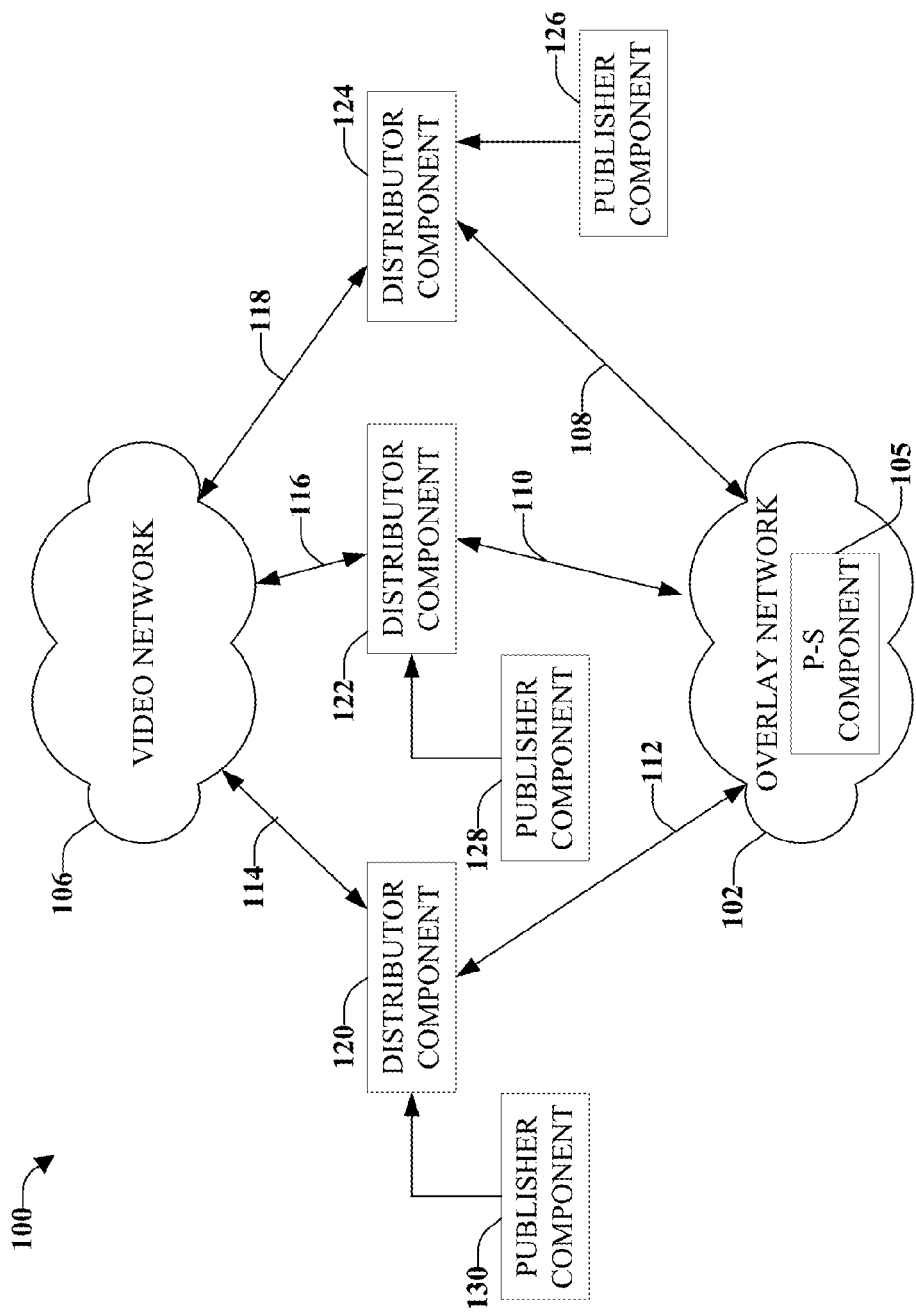
FIG. 1 is a block diagram illustrating an example, non-limiting embodiment of a system for providing an overlay stream in accordance with various aspects and implementations described herein.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

As used herein a live video stream includes video data, generated and distributed in real time to multiple recipients. An overlay can refer to any visual element visible on a video that was originally not a part of the live video stream. Overlays can comprise text, and/or geometric shapes and may be applied to the video either during or before it is displayed on a user's device. Overlays can be generated in real-time, in response to real time events. A live overlay stream is a stream of overlays, created and distributed in real time to multiple overlay recipients. An overlay distribution system is a system for delivering overlays to multiple, possibly geographically distributed overlay recipients.

A broadcasting based overlay distribution system is a distribution system for overlays that does not suffer significant load increase corresponding to an increase in the number of overlay recipients. A unicasting based overlay distribution system is a distribution system that does suffer a significant load increase corresponding to an increase in the number of overlay recipients. An overlay distributor or overlay distribution component can be any computer software or hardware that distributes (either by request or by pushing) overlays to overlay recipients in real time, and also receives overlay publish requests from overlay publishers, propagates and/or distributes them to all overlay recipients. An overlay recipient (e.g., overlay subscriber) can be any computer software or hardware that makes requests to the overlay distributor or overlay distribution component for retrieving overlays, in which can also limit its overlay requests to any time interval, which is a sub-interval of the time extent from the present time to a time in the past corresponding to the beginning of the live overlay stream. In addition, an overlay publisher or overlay publisher component can be any computer software or hardware component that makes requests to the overlay distributor for publishing overlays.

It is to be appreciated that in accordance with one or more implementations described in this disclosure, real time overlay streams are unicasted to clients by a system (e.g., a unicasting based overlay distribution system) to provide overlay messages corresponding to events occurring live in a separate video stream. The events occurring live are distributed in real time across separate communication distribution channels from overlay channels. The system thus enables the real time distribution of a live overlay stream.

Live overlay streams are generated by a system, for example, that associates the data images of the live overlay streams with events of a live video stream distributed over a wide area network. The distribution of overlays is made on a channel, which is separate from the channel on which the live video stream is distributed. The overlay stream is created in real time and can be distributed to multiple, possible geographically separated recipients. The overlay distribution system supports a very large number of users, and has a high availability and low latency. The overlay streams generated by the system originate from geographically distributed overlay publishers, and are distributed to potentially a multitude of clients subscribers in real time with substantially low latency. Low latency refers to the fact that the overlays or overlay messages in the live overlay stream can be generated in response to events occurring in real time, and transmitted as such on, with or over the live video stream. Therefore, the latency between the real event and overlays, and consequently between the live video stream and the overlay stream is kept substantially non-existent.

Exemplary Computing Device

Referring initially to FIG. 1, illustrated is a system 100 that operates as an overlay distribution system that distributes overlay streams having overlay messages to various clients. The system 100 comprises an overlay network 102 that is communicatively connected to a plurality of overlay distribution components 120, 122, and 124, which are also communicatively connected to a video network 106 that distributes live events in a video stream channel.

The overlay network 102 includes a publisher subscriber system component 105 that communicatively couples the plurality of overlay distribution components 120, 122, and 124 with one another for distribution of one or more overlay streams in overlay channels 108, 110 and/or 112. Overlay distribution components 120, 122, and 124 include overlay publisher components 126, 128, and 130 that generate an overlay stream having overlay messages that correspond to events of video streams in real time, which are distributed from channels 114, 116, and 118 from the video network 106, which are separate and different distribution channels from the overlay stream channel. Although channels 114, 116, and 118 are shown in connection to the plurality of overlay distribution components, the example illustrated is not limited to only the video channels 114, 116, and 118. For example, the video network 106 can also distribute video streams to the overlay network 102 and the overlay publishing components 126, 128, and 130.

The system 100 operates as a distribution network that distributes overlay streams having data images, overlay messages, and/or video data to overlay events occurring in a separate video stream distributed in a separate channel for user viewing. For example, a live video stream of a swim competition can be distributed across the video network, which can include a broadcasting network, or some other distribution network that distributes the video streams live or in real time of the swim competition. Concurrent to the live video stream feed of the swim competition, an overlay or separate image data is distributed corresponding to the live streaming events of the swim competition. For example, a gun-shot starting the race could be streamed in a video channel, while at the same time words or text such as "START" could flash on the bottom of a presentation screen for user viewing.

In other examples, various annotations can be part of the overlay stream and the overlay messages therein. For example, small symbols can be displayed on top of a seekbar or control feature bar controllable by the user in design and position. The small symbols can be visible from everywhere in the live distributed video, signaling major events in the stream (e.g., goal, win, score, foul, crash, etc.) depending upon the events. On roll over the bar can show a tooltip (with a video screen shot of that specific time) with more details. Each annotation has a Cue Range associated to it. Aside from this, a marker annotation will also have a seekbar ball marker associated to it, which will be automatically added to the seekbar. The annotation text can also be sent forward the seekbar to be displayed accordingly. In another embodiment, each play by play (timeline) annotation can be supplied to the video data through the overlay and time line data.

The overlay publishing components 126, 128 and 130 publish in real time overlay streams that can be different from one another depending upon a demographic, a geographical location, region or the like. For example, the overlay publisher component 130 can publish in real time an overlay corresponding to events distributed in real time. The overlay publisher component 130 thus submits publishing request to an associated distributor, such as the overlay distribution component 120. In response to the published overlay messages received by the overlay publisher component 130, the overlay distribution component 120 can automatically forward these overlay components to subscriber units (not shown) and/or to the publisher subscriber system component.

In one example embodiment, the overlay channels used to communicate the overlay streams can be separate channels from the video stream channels for viewing the events live. For example, the overlay streams can be unicasted and communicated separately from the at least one overlay distribution component to one or more of the plurality of overlay distribution components 122, 124 and 126. In one embodiment, the publisher subscriber system component 105 receives a request from one or more of the overlay distribution components 122, 124 and 126. The publisher subscriber system component 105 could further distribute overlay streams published to other overlay distribution components that do not have local access (e.g., via a local cache or local store) to a particular overlay stream from a local or associated overlay publisher component. For example, the publisher subscriber system component 105 can distribute published overlay streams from overlay publisher components to overlay distribution components having not stored the published overlay streams requested by other non-local clients, or to overlay distribution components that are at least partially not communicatively connected to a portion of the overlay publisher components publishing the published overlay streams in order to provide requested access to a client viewing the events in the video stream live.

Figure 2:
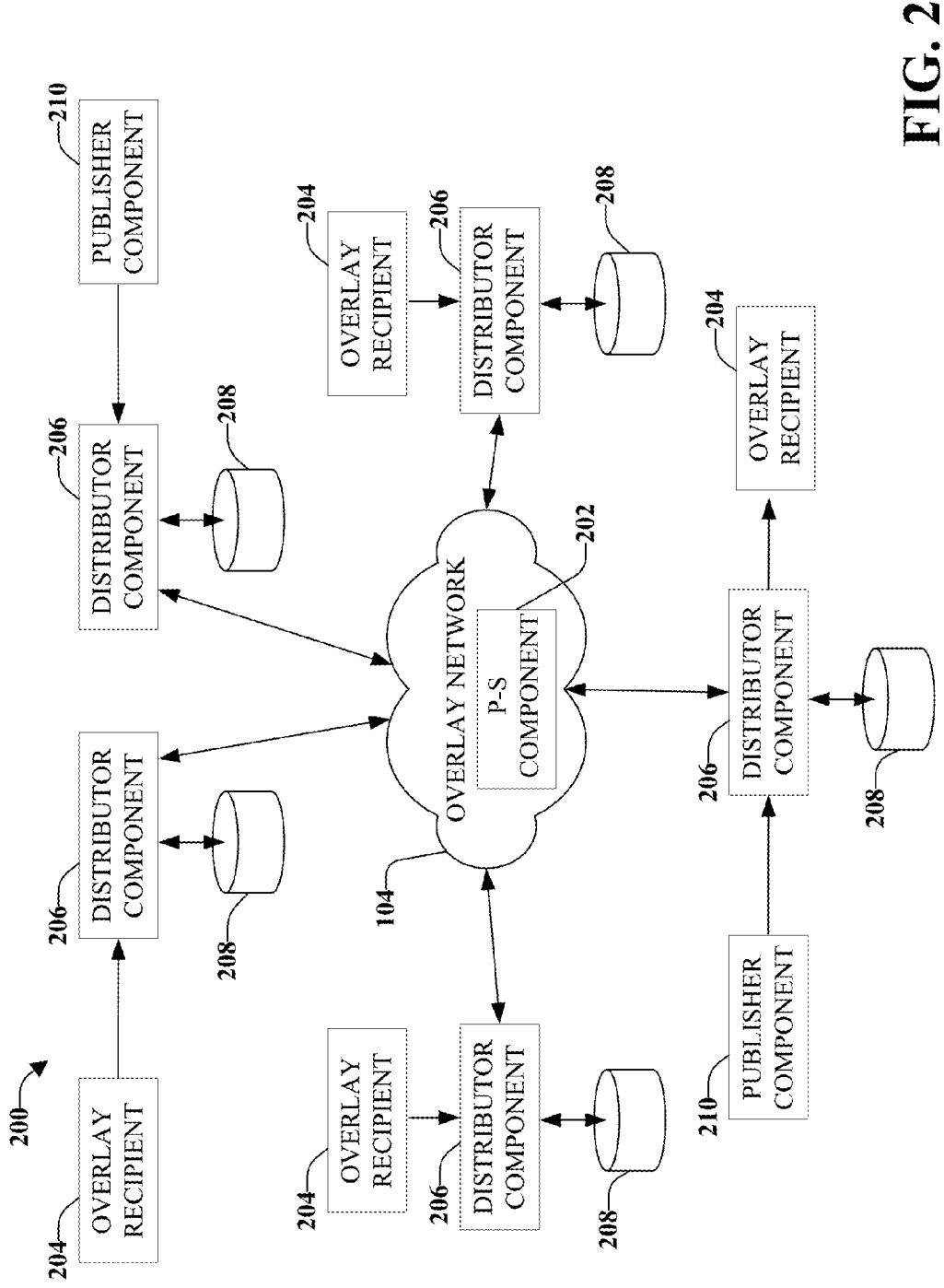
FIG. 2 is a block diagram illustrating another example, non-limiting embodiment of a system for providing an overlay stream accordance with various aspects and implementations described herein.

Referring now to FIG. 2, illustrated is a system 200 that provides for unicasting real time overlay to live streams of video in accordance with various embodiments disclosed. The system 200 operates as an overlay distribution system that is a low latency, high availability unicasting based real time overlay distribution system that is operable to distribute overlay streams to a very large number of concurrent overlay recipients 204 (e.g., subscriber clients), such as through the overlay network 104 and publisher subscriber component 202. For example, the overlays are requested by the overlay recipient 204 from an overlay distributor component 206. The overlay distributor components 206 can be conveniently located geographically close to the overlay recipients 204 can be replicated to provide high availability and cache overlays in memory to be able to deal with a high load. Overlay publishers 210 can contact any of the overlay distributor components 206 requesting that some overlays should be published.

The publisher subscriber component 202 enables the overlay publisher components 210 to publish an overlay message (e.g., "GOAL!"). A subscriber, such as, overlay recipient(s) 204, overlay distributor component(s) 206, and/or the overlay publisher(s) 210 can register to the publisher-subscriber system component 202, and in response to the registration, each of these subscribers receive an overlay message at least once. Likewise, an overlay distribution component 206 can register overlay recipients and/or overlay publisher components 210 thereat. Any subscriber (e.g. overlay recipient 204) can then receive a message again if an acknowledgement is not received. Once an acknowledgement is received, either at the publisher-subscriber component 202 and/or the overlay distribution component 206, a subscription for the particular overlay stream having overlay messages from one or more particular publisher components 210 is established for user viewing. A user is then able to have an overlay stream that corresponds to a video stream to enhance the viewing experience.

In one embodiment, the overlay stream is received on a separate overlay distribution channel than the video stream being viewed (e.g., by broadcast). For example, the video stream is distributed via a unicast channel. Unicast communication is the sending of messages to a single network destination identified by a unique address, for example.

In another embodiment, a local storage 208 exist for the overlay distributor components 206, which can store overlays, for multiple streams and allow their retrieval given the overlay stream and a time interval. The local storage 208 allows for a high degree of durability to the written overlay stream having overlay messages corresponding to a live video stream.

The overlay distributor components 206 are a software/hardware component (which can have one or more multiple jobs such as overlay distributions to recipients running on one or multiple machines). An overlay distributor component 206 has access to the local (e.g., permanent) storage 208, in which it can store overlays (e.g., overlay streams, partially or entirely). In addition, the overlay distributor components 206 interact with the underlying publisher-subscriber component 202 both as a publisher and as a subscriber. For example, the overlay distributor components 206 receive requests from the overlay publishers 210. In response to receiving publishing requests from the publishers, the distributor components 206 distribute overlays to multiple overlay recipients. This distribution can be based on a subscription that recipients 204 establish with particular publisher components or not.

In one example of an embodiment, the overlay recipients 204 can request, at any time, overlays corresponding to any time interval (extending anywhere from the present time to the beginning of the live overlay stream). Generally, a majority of overlay recipients 204 would retrieve real-time data, corresponding to a small past time interval, extending backward from the current time, but this is not necessary.

In response to the overlay distributor component 206 receiving a request to publish an overlay stream or overlay message from an overlay publisher component 210, the distributor component 206 publishes the overlay via the publisher-subscriber system component 202 on the overlay channel 104. If the publication is successful, the overlay distributor writes the overlay stream to the local storage 208. If the writing to the local storage 208 is successful then the overlay distributor component 206 acknowledges the submission to the overlay publisher 210. If any of the two acts (publishing and/or storing) is unsuccessful, an error condition message is signaled to the overlay publisher 210, which can then retry to publish the overlay any time. Following this, the overlay distributor component 206 writes the overlay to a local cache (not shown), which is further detailed below.

In another embodiment, not all distributor components 206 are registered with all publisher components 210 and/or with all overlay recipients 204. Thus, the publisher subscriber component 202 with the overlay network 104 coordinates the system 200 on a wider scale. For example, overlay distributor components can be at different geographical locations or regional locations, but can reside near the distributors, which operate as servers for the overlay streams being published. The overlay stream thus can be created in real time by the publisher components 210, which can be geographically distributed, and be distributed by the distributor components 206 to multiple, possible geographically separated recipients 204.

Figure 3:
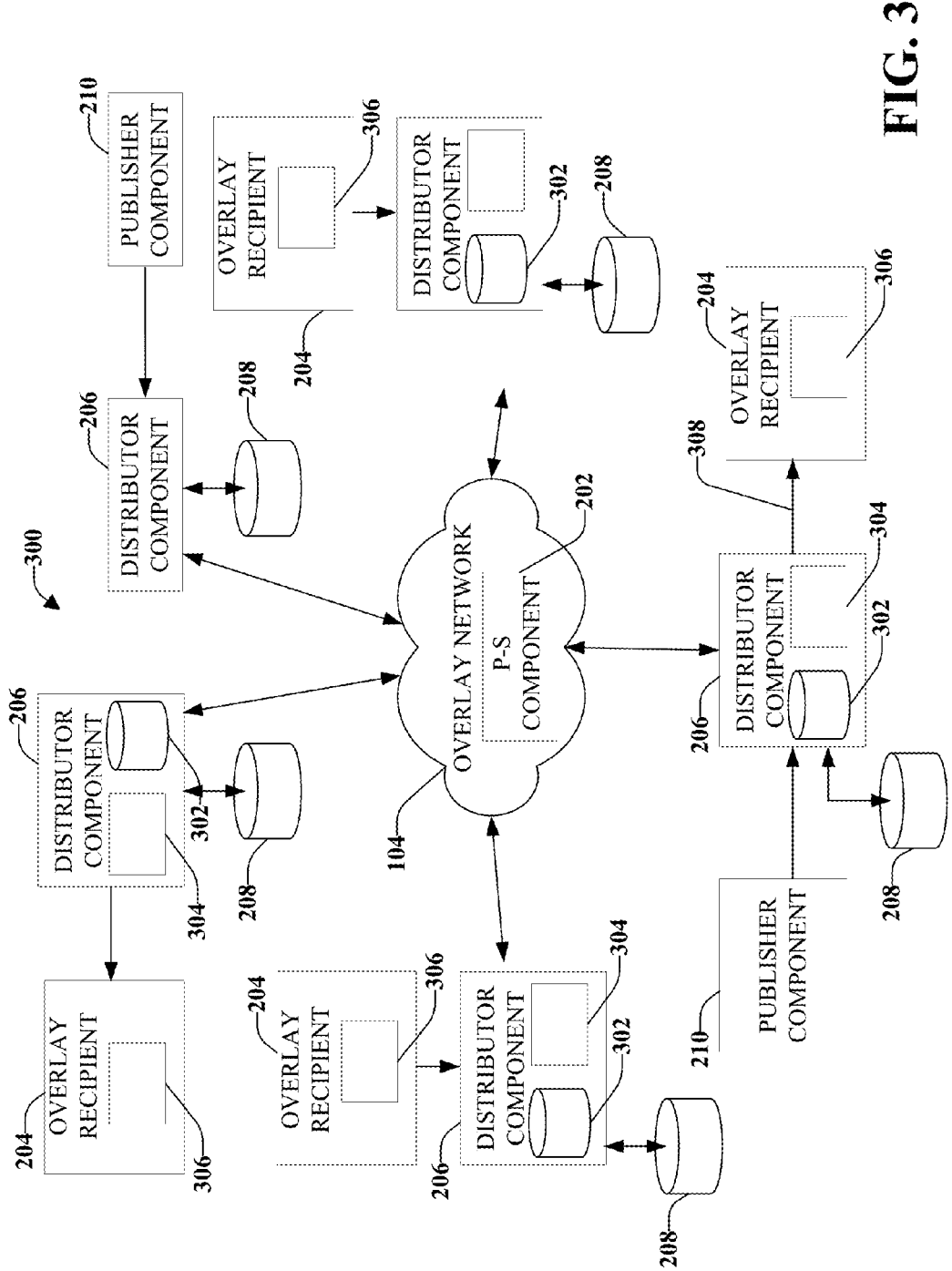
FIG. 3 is a block diagram illustrating an example, non-limiting embodiment of a system that generates an overlay stream with a presentation and communication component in accordance with various aspects and implementations described herein.

Referring now to FIG. 3, illustrated is a system 300 having various aspects of embodiments disclosed. In response to the overlay distributor components receiving a published overlay via a message from one or more overlay publisher components 210 from the publisher-subscriber (P-S) component 202, the overlay distributor components 206 first write the overlay stream to the local storage 208. The overlay distributor components 206 then acknowledge the message received to the publisher-subscriber component 202. The overlay distributor components 206 then store the received message inside a local cache 302.

In response to the overlay distributor components 206 receiving a request from overlay recipients 204 to retrieve overlays corresponding to a live video stream and also to a time interval, the overlay distributor components 206 analyzes the local cache 302 for the specified overlay stream and for the specified time interval of the overlay stream requested. If there are overlays spanning the entire requested time interval, then the overlay distributor component 206, for example, returns them all, and does not contact the local storage 208. If, on the other hand, the time interval exceeds the available overlay time span in the local cache, the overlay distributor component 206 can make an additional request to the local storage 208 to retrieve the (possibly missing) overlays for the requested time interval. However in addition, if the local cache has no information about the live video stream requested, the overlay distributor component 206 can request, from the local storage 208 all the overlays from the current time up to the original overlay recipient's 204 requested last timestamp, or in other words, the overlay stream since the original request. The overlay distributor component 206 can then store the retrieved overlays in the local cache 302, and return, to the overlay recipients 204 the subset corresponding to the original request, which can be less than the entire requested time interval of overlay.

The overlay recipients 204 further include presentation components 306 that respectively present a video stream of events occurring in real time via a first video channel for user viewing. The overlay streams are further distributed to the overlay recipients 204 on a different (e.g., unicast stream) 312 to provide corresponding overlays to the events in real time. Thus, the overlay distribution components 206 publish a set of overlay streams (e.g., one or more) in real time via a second channel respectively to enhance the user viewing of the video stream of events occurring in real time. The overlay distribution components 206 respectively comprise an overlay communication component 304 that communicates the overlay stream to a plurality of overlay recipients over the second channel being a different channel than the first channel and/or of a different format (e.g., broadcast, unicast, etc.) than the set of presentation components presenting the video stream with the overlay stream.

In addition, overlay streams received can be different from other overlay streams published by different publishing components. Therefore, a viewer can also request a certain overlay stream from a particular publisher component 210 as discussed above with regards to the local cache 302. For example, the local cache 302 is a data structure maintained in memory by each overlay distributor component 206. The local cache 302 enables a decrease in latency and improves load handling by decreasing the number of requests made to the local storage 208. The local cache 302 stores, for multiple live overlay streams, overlays having a high probability of being requested by a large number of overlay recipients 204, which can be determined by a predetermined threshold. The local cache 302 also operates according to a garbage collection algorithm for limiting its size, so as not to exceed a predetermined memory limit.

For example, the cache 302, stores, for each live overlay stream, a sorted collection of overlays, which can correspond to different live video streams (e.g., different sport events, from different regions, etc.) distributed in real time to viewers. The overlays are sorted by the time according to when each overlay was published by a publisher component 210 to an overlay distributor component 206. The overlay collection is operable for efficient insertion, efficient retrieval of the overlays within a given time interval and efficient finding and removal of the overlay with the smallest publication time. An example of such a collection is a balanced binary search tree configuration or algorithm.

The cache 302 has policies for the maximum number of overlays per live overlay stream, the maximum time to live for overlays and a maximum memory, which can be predetermined according to predetermined criteria (e.g., resource limits, popularity of video stream, popularity of publisher component, etc.), for example. The garbage collection algorithm enforces these policies. The cache ignores overlay inserts beyond its capacity, as dictated by these policies.

When the overlay distributor component 206 inserts a set of overlays in the cache 302, they are inserted in the collection corresponding to the live overlay stream according to their timestamp. An invariant of this local cache 302 is that, if it contains overlays for a given live overlay stream it can contain a contiguous, possibly empty, span of the most recent overlays, starting from the current time.

Figure 4:
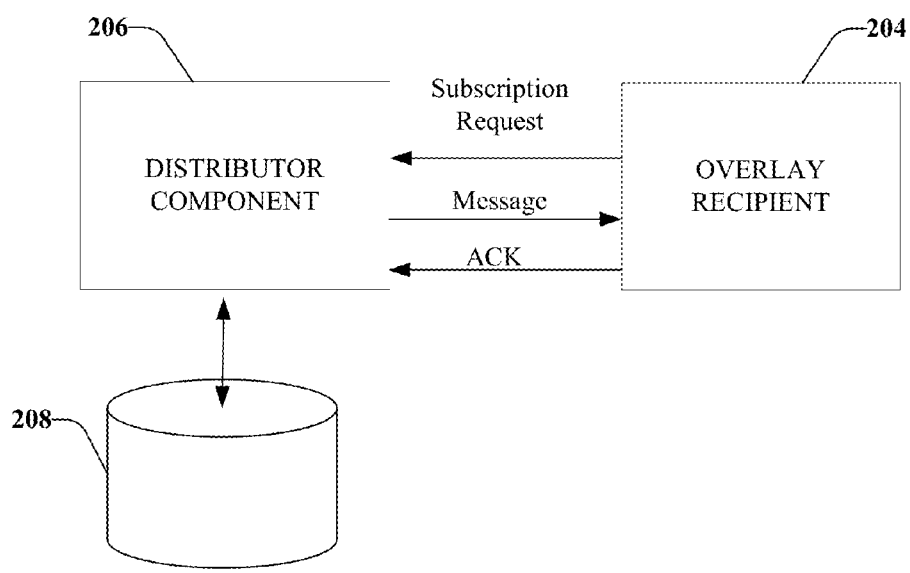
FIG. 4 is a block diagram illustrating an example, non-limiting embodiment of a system that distributes an overlay stream in accordance with various aspects and implementations described herein.

Referring now to FIG. 4, illustrated is an example aspect of a system for providing overlay streams having overlay image data to a subscriber recipient component or an overlay recipient component 204. The overlay recipient component 204, for example, can request, at any time, overlays from the overlay distributor component 206 corresponding to any time interval, which extend from a present or time of the request to the beginning of the live overlay stream. The recipient component 204 registers to a publisher subscriber component 105 discussed above, and receives either from the publisher subscriber component 105 and/or from the overlay distributor component 206 a message at least once. The subscriber or recipient component 204 will be sent the message again if it does not acknowledge the message. After an acknowledgment is communicate from the recipient to the distributor component, a subscription can be established to a particular overlay stream of a publisher component for a live video feed in real time, which is distributed via a different channel (e.g., broadcast).

Figure 5:
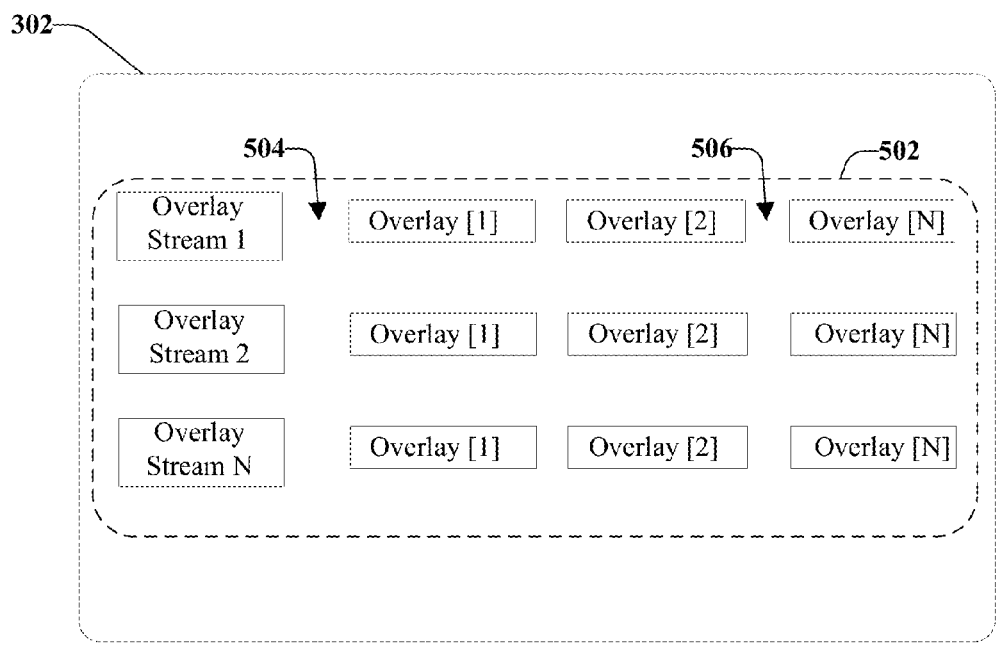
FIG. 5 is a block diagram illustrating an example, non-limiting embodiment of a system that distributes an overlay stream to recipients in accordance with various aspects and implementations described herein.

Referring to FIG. 5, illustrates a stored collection of overlay streams 502 of the local cache 302. The local cache 302 stores the collection of overlay streams 502 for each live overlay stream. The overlays are sorted by a time when they were published. The collection is operable for efficient insertion, such as at insertion points 504 and 506, which enables efficient retrieval of each overlay steam within a given time interval. For example, time stamped overlays of image data may be inserted into a given time interval with the smallest publication time. A balanced binary search tree, for example, can be used to insert and organize the times with the overlays images. When the overlay distributor 206, for example, inserts a set of overlays in the cache 302, each overlay is inserted into the collection corresponding to the live overlay stream according to their time stamp. An invariant of this local cache, therefore is that, if it contains overlays for a given associated live overlay stream it can include a contiguous, possibly empty, span of the most recent overlays, starting from the current time.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference is made to the figures described above for ease of description. However, the methods disclosed are not limited to any particular embodiment or example provided within this disclosure.

Figure 6:
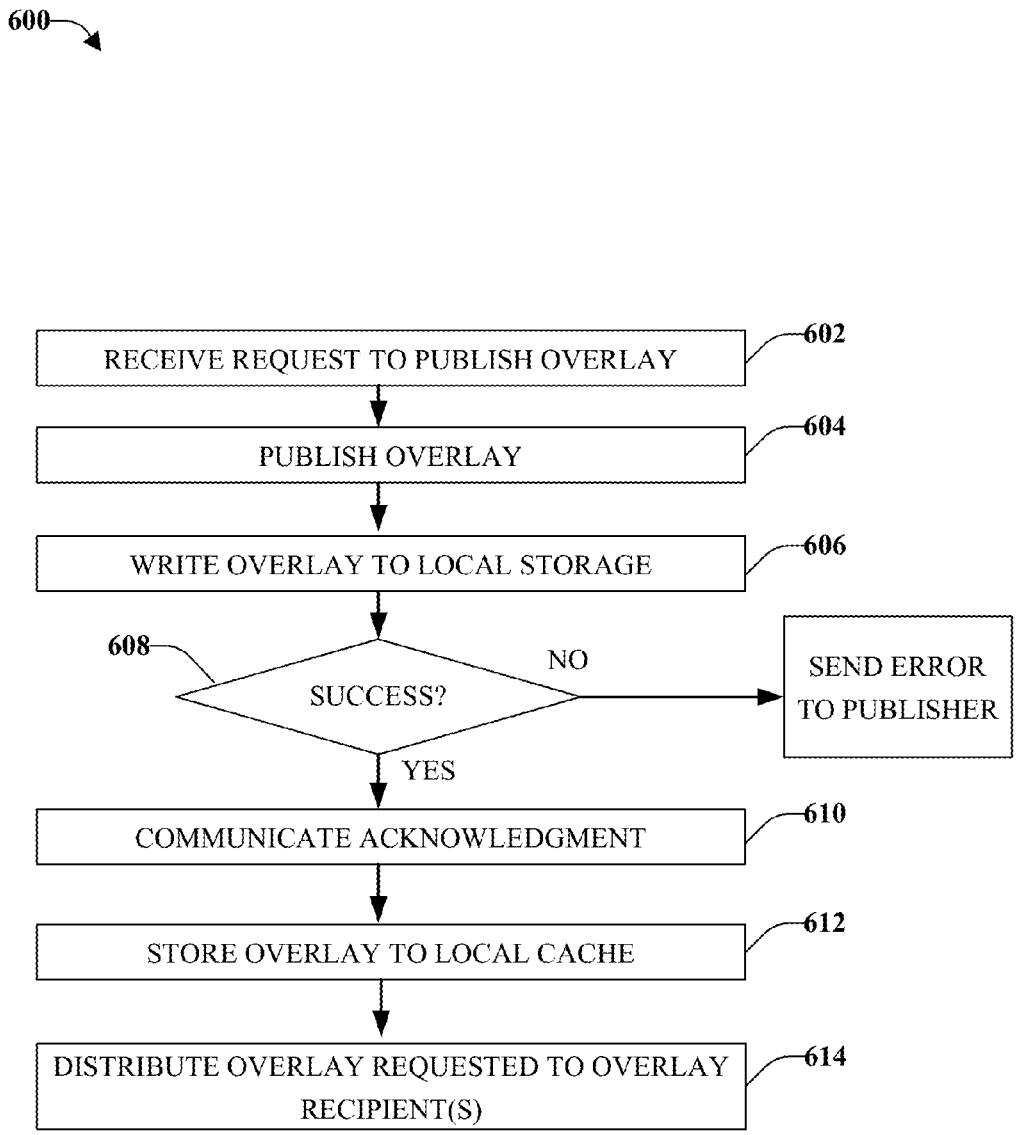
FIG. 6 a flow diagram of an example, non-limiting embodiment for distributing overlay streams in accordance with various aspects and implementations described herein.

FIG. 6 illustrates an exemplary method 600 for a system that generates and distributes overlays in real time corresponding to a video stream of events in real time with efficient local caching. At 602, an overlay distributor component receives a request to publish an overlay stream or overlay message from an overlay publisher component. At 604, the overlay distributor component publishes the overlay streaming having image data via the publisher-subscriber system component on an overlay channel. At 606, in response to the publication being successful, the overlay distributor writes the overlay stream to the local storage. At 608, a decision is made as to whether the publishing and/or the writing to the local storage is successful (YES/NO). If Yes the writing to the local storage is successful, then the overlay distributor component the process flows to 610 where an acknowledgement is sent acknowledges to the overlay publisher. If No any of the two acts (publishing and/or storing) is unsuccessful, an error condition message is signaled to the overlay publisher, which can then retry to publish the overlay any time. Following this, at 612 the overlay distributor component writes the overlay to a local cache. At 614, overlays requested by recipient components are distributed to correspond to real time events in a live video stream.

Figure 7:
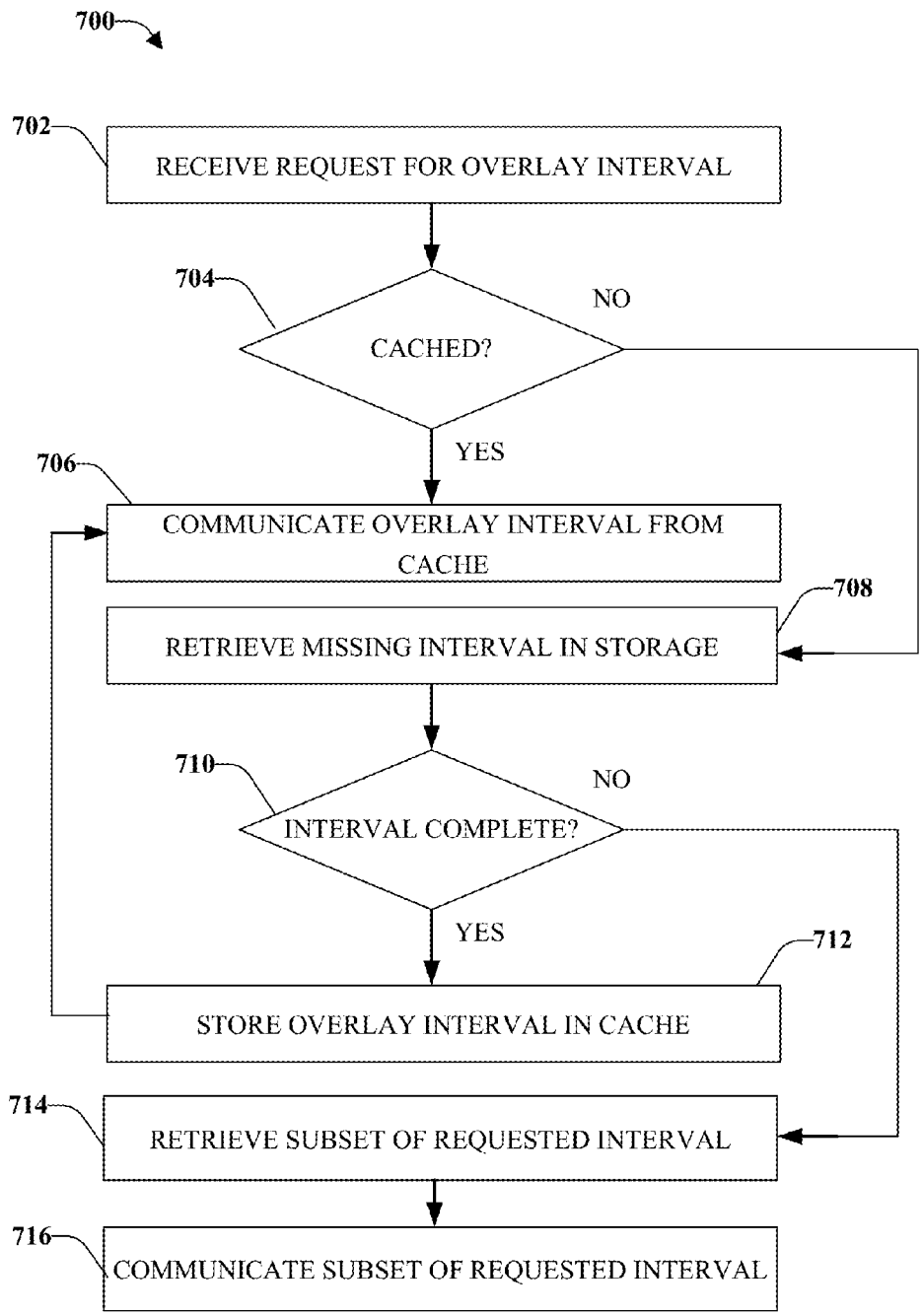
FIG. 7 illustrates a flow diagram of an example, non-limiting embodiment for distributing overlay streams in accordance with various aspects and implementations described herein.

Referring to FIG. 7, illustrated is a method 700 for a system that generates and distributes overlays in real time corresponding to a video stream of events in real time with efficient local caching. At 702, a set of overlay distributor components (at least one) receive a request from overlay recipients to retrieve overlays corresponding to a live video stream and also to a time interval. At 704, a decision is made whether the overlay requested is locally cached (YES/NO). The overlay distributor components analyze the local cache for the requested overlay stream and for the specified time interval of the overlay stream requested. If the answer is yes, there are overlays spanning the entire requested time interval cached, and then the overlay distributor component communicates, at 706, the overlays, and does not contact the local storage. If the answer is no, for example, where the time interval exceeds the available overlay time span in the local cache, the overlay distributor component 206 can make an additional request, at 708, to the local storage to retrieve the (possibly missing) overlays for the requested time interval. At 710, a decision is made as to whether the local storage contains the remainder or all missing information for the requested interval. If the answer is No, the overlay distributor component can request, from the local storage all the overlays from the current time up to the original overlay recipient's requested last timestamp, or in other words, the overlay stream since the original request (e.g., a subset). The overlay distributor component can then store the retrieved overlays in the local cache, and return, to the overlay recipients, at 716, the subset corresponding to the original request, which can be less than the entire requested time interval of overlay. If the answer is yes, then the overlay distributor stores the interval of overlay stream requested in the local cache. The process then continues to 706 where the overlay requested is communicated to recipients from the cache.

Figure 8:
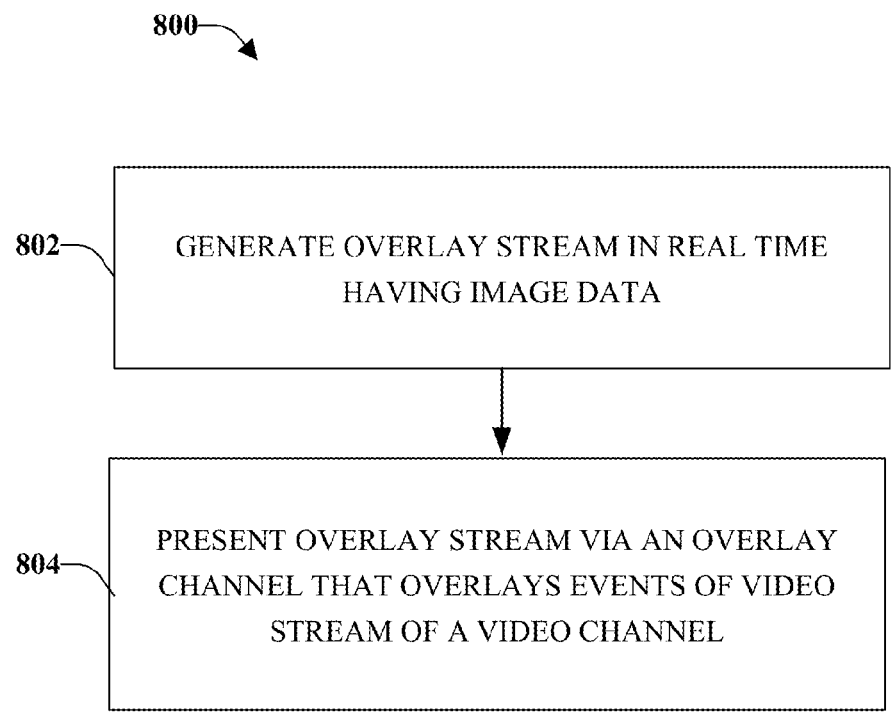
FIG. 8 illustrates a flow diagram of an example, non-limiting embodiment for distributing overlay streams in accordance with various aspects and implementations described herein.

FIG. 8 illustrates a method 800 for an overlay stream that is live and corresponding to a live video stream. At 802, an overlay stream is generated live in real time that corresponds to a live video stream, which is in real time. At 804, the live overlay is presented over an overlay channel, for example, unicasted over a unicast channel, while the video stream is communicated in a different channel, such as a video stream channel.

Figure 9:
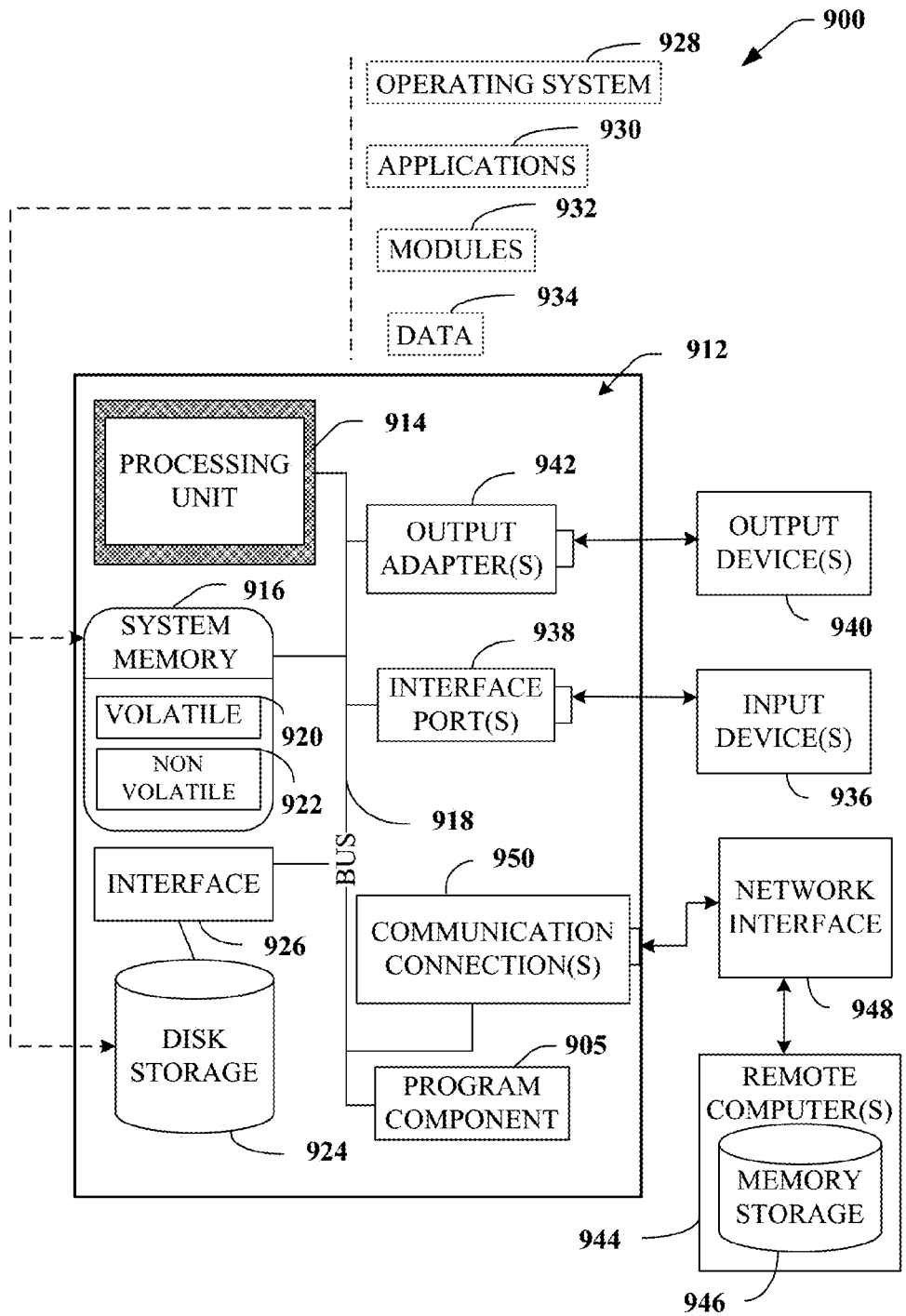
FIG. 9 is a block diagram illustrating an example computing device that is arranged in accordance with various aspects and implementations described herein.

With reference to FIG. 9, a suitable environment 900 for implementing various aspects of this disclosure includes a computing device 912. It is to be appreciated that the computer 912 can be used in connection with implementing one or more of the systems or component shown and described in connection with FIGS. 1-5. The computing device 912 includes a processing unit(s) 914, a system memory 916, and a system bus 918. The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/non-volatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912, and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used to identify unauthorized uploaded content that is received before a live reference stream is ingested. Computing device 912 can also issue copyright infringement claims against the user uploaded content in response to determining the user uploaded content is unauthorized. As more fully disclosed herein, in some implementations, the computing device 912 can include one or more processors (e.g., 914) that can be used to process data, including processing data to perform various tasks (e.g., indexing uploaded content, matching validated live reference streams against the indexed uploaded content, identifying unauthorized uploaded content, issuing claims against the uploaded content, performing utility based analyses, etc.). The computing device 912 can include a program component 905 that can be associated with (e.g., communicatively connected to) the one or more processors. The program component 905 can contain, for example, a indexing component, a matching component, a purging component, and a claim component and/or other components, which can respectively function as more fully disclosed herein, to facilitate identifying matches between user uploaded media content and validated content and issuing copyright claims against the user uploaded media content when the user uploaded media content is uploaded first.

Exemplary Networked and Distributed Environments

Figure 10:
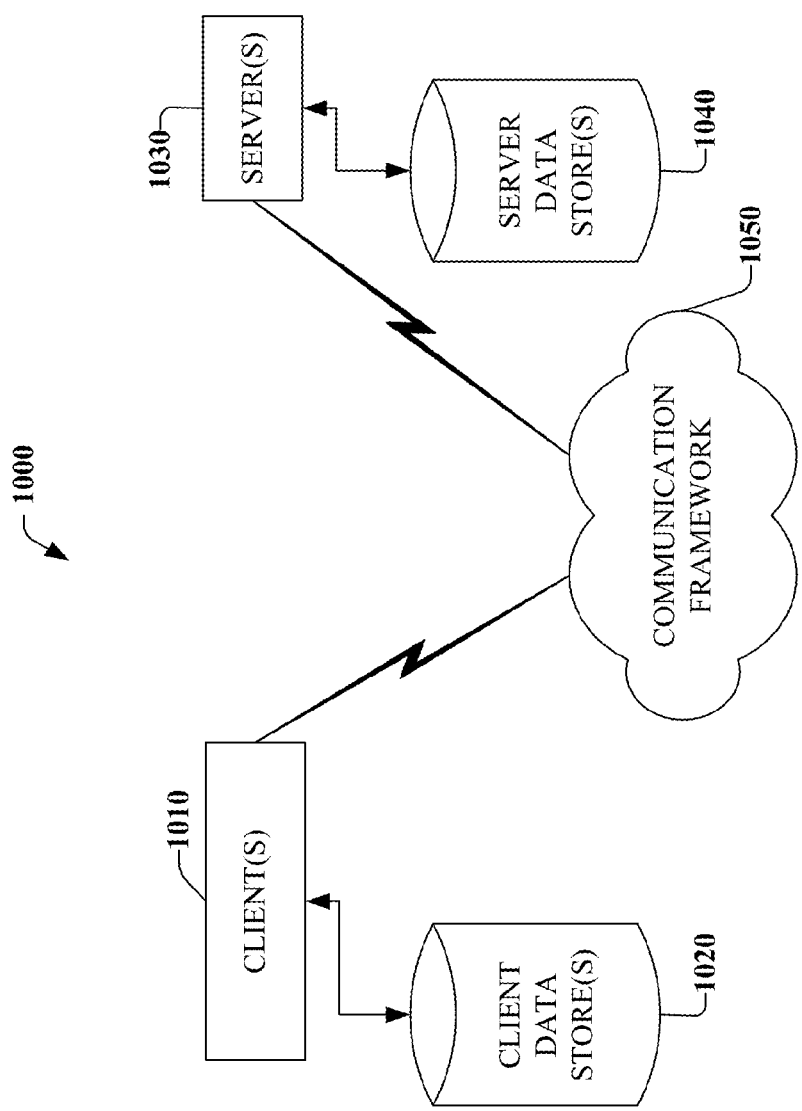
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a non-transitory computer readable storage medium including computer-executable instructions which when executed by the processor cause the processor to perform operations comprising:
   storing a policy specifying a maximum number of overlay messages that can be stored in a cache for a live video stream of events occurring in real time, the live video stream distributed to a plurality of recipients via a first channel;
   receiving an overlay message that corresponds to the live video stream of events;
   determining not to store the received overlay message in the cache based on the cache including, for the live video steam, the maximum number of overlay messages specified by the policy;
   generating, by the computer system, an overlay stream in real time that includes a plurality of overlay messages that correspond to the events of the live video stream of events, one or more of the plurality of overlay messages stored in the cache; and
   publishing the overlay stream to the plurality of recipients via a plurality of second channels.

2. The system of claim 1, wherein the one or more overlay messages are stored in the cache based on having a predetermined threshold probability of being requested by a recipient.

3. The system of claim 1, wherein the first channel is a broadcast channel and each of the plurality of second channels is a unicast channel.

4. The system of claim 1, wherein at least one of the plurality of recipients receives the overlay stream based on a subscription.

5. The system of claim 1, wherein the overlay stream is a unicast stream and each of the plurality of second channels is a unicast channel.

6. The system of claim 1, wherein the maximum number is determined based upon a popularity measure of the live video stream of events.

7. A method, comprising:
   storing a policy specifying a maximum number of overlay messages that can be stored in a cache for a live video stream of events occurring in real time, the live video stream distributed to a plurality of recipients via a first channel;
   receiving, by the computer system, an overlay message that corresponds to the live video stream of events;
   determining, by the computer system, not to store the received overlay message in the cache based on the cache including, for the live video steam, the maximum number of overlay messages specified by the policy;
   generating, by the computer system, an overlay stream in real time that includes a plurality of overlay messages that correspond to the events of the live video stream of events, one or more of the plurality of overlay messages stored in the cache; and
   publishing, by the computer system, the overlay stream to the plurality of recipients via a plurality of second channels.

8. The method of claim 7, wherein the one or more overlay messages are stored in the cache based on having a predetermined threshold probability of being requested by a recipient.

9. The method of claim 7, wherein the first channel is a broadcast channel and each of the plurality of second channels is a unicast channel.

10. The method of claim 7, wherein at least one of the plurality of recipients receives the overlay stream based on a subscription.

11. The method of claim 7, wherein the overlay stream is a unicast stream and each of the plurality of second channels is a unicast channel.

12. The method of claim 7, further comprising determining the maximum number based upon a popularity measure of the live video stream of events.

13. A non-transitory computer-readable medium having instructions stored thereon that, in response to execution, cause a system including a processor to perform operations comprising:
   storing a policy specifying a maximum number of overlay messages that can be stored in a cache for a live video stream of events occurring in real time, the live video stream distributed to a plurality of recipients via a first channel;
   receiving an overlay message that corresponds to the live video stream of events;
   determining not to store the received overlay message in the cache based on the cache including, for the live video steam, the maximum number of overlay messages specified by the policy;
   generating an overlay stream in real time that includes a plurality of overlay messages that correspond to the events of the live video stream of events, one or more of the plurality of overlay messages stored in the cache; and
   publishing the overlay stream to the plurality of recipients via a plurality of second channels.

14. The non-transitory computer-readable medium of claim 13, wherein the one or more overlay messages are stored in the cache based on having a predetermined threshold probability of being requested by a recipient the recipients.

15. The non-transitory computer-readable medium of claim 13, wherein the first channel is a broadcast channel and each of the plurality of second channels is a unicast channel.

16. The non-transitory computer-readable medium of claim 13, wherein the overlay stream is a unicast stream and each of the plurality of second channels is a unicast channel.

17. The non-transitory computer-readable medium of claim 13, the operations further comprising determining the maximum number based upon a popularity measure of the live video stream of events.

* * * * *

UNITED STATES PATENT AND TRADEMARK OFFICE
CERTIFICATE OF CORRECTION

PATENT NO. : 9,456,230 B1  
APPLICATION NO. : 14/444626  
DATED : September 27, 2016  
INVENTOR(S) : Silviu Bota, Bianca Milatinovici and Christian Ingemar Falk It is certified that error appears in the above-identified patent and that said Letters Patent is hereby corrected as shown below:

On the Title Page

Item (71) Applicant: delete "Mounain" and insert --Mountain--.

In the Claims

Column 16, Line 19, delete "steam," and insert --stream,--.

Column 16, Line 54, delete "steam," and insert --stream,--.

Column 18, Line 1, delete "steam," and insert --stream,--.

Signed and Sealed this  
Twenty-seventh Day of February, 2018

Andrei Iancu  
*Director of the United States Patent and Trademark Office*